March 24, 1970 R. K. DICKEY 3,502,809

METHOD AND APPARATUS FOR PHASE-OR FREQUENCY-MODULATING SIGNALS AT HIGH POWER LEVELS BY MEANS OF SATURABLE MAGNETIC CORES

Filed Feb. 4, 1966 5 Sheets-Sheet 1

INVENTOR
RICHARD K. DICKEY
BY

ATTORNEYS

INVENTOR
RICHARD K. DICKEY

BY
Mellin, Moore & Weissenberger
ATTORNEYS

INVENTOR
RICHARD K. DICKEY
BY
Mellin, Moore & Weissenberger
ATTORNEYS

INVENTOR
RICHARD K. DICKEY

BY

Mellin, Moore & Weissenberger
ATTORNEYS

INVENTOR
RICHARD K. DICKEY
BY
Mellin, Moore & Weissenberger
ATTORNEYS

United States Patent Office 3,502,809

Patented Mar. 24, 1970

3,502,809

METHOD AND APPARATUS FOR PHASE- OR FREQUENCY-MODULATING SIGNALS AT HIGH POWER LEVELS BY MEANS OF SATURABLE MAGNETIC CORES

Richard K. Dickey, San Luis Obispo, Calif., assignor to Technical Material Corporation, Mamaroneck, N.Y., a corporation of New York Filed Feb. 4, 1966, Ser. No. 525,078
Int. Cl. H04l *27/24*
U.S. Cl. 178—67 33 Claims

ABSTRACT OF THE DISCLOSURE

Transient-free phase or frequency modulation of alternator-generated radio signals in the megawatt range is accomplished by connecting each of the alternator phases to the antenna through a saturable reactor, and sequentially saturating the reactors at a modulating frequency preferably derived from a second alternator. Upper- or lower-sideband modulation, or transient-free transition from one phase to another, is achieved by using a second, keyable set of saturable reactors to switch the phases of the second alternator so as to control the sequence in which the first reactors are saturated. Means for using the saturable core concept for automatic frequency stabilization and audio modulation instead of keying are also disclosed.

This invention relates to a method and apparatus for producing a frequency-modulated or phase-modulated alternating current signal, and more particularly to a method and apparatus which accomplishes frequency modulation or phase modulation by the sequential selection of constant-amplitude, continuously coexisting phases of a base signal and by the combination of such selected phases or portions thereof into a common output.

Although the method and apparatus described herein have widespread application in the field of electronics, the principal problem out of which the present concept arises relates to the transmission of extremely high powered radio signals. Conventionally, radio signals are produced by electronic means which produce a carrier signal, and this carrier signal is then modulated in an electronic mixer to produce the desired modulated signal. With the advent of recent new areas of communication which require an extremely strong signal, electro-mechanical alternators have been developed which are capable of producing radio-frequency signals at a power level in the magawatt range without creating the cooling problems which make generation of such signals by electronic means economically unrealistic.

The problem with electro-mechanical equipment of this type is how to modulate such high power signals. Not only can such signals not be modulated by conventional means, but there must be no substantial discontinuity in the wave train as a result of the modulation because any significant discontinuity at such power levels would create transients of sufficient intensity to damage the antenna.

The present invention solves the above problem and opens new possibilities of modulation in the electronic field in general by the basic concept that a frequency- or phase-modulated wave can be produced by continuously producing two or more phase-displaced signals of identical frequency, connecting them to a common output through gating means, and operating the gating means so as to successively select all or portions of individual ones of those signals for transmission to the common output.

Building on this basic concept, the present invention teaches the following sub-concepts:

(a) The continuous transition of a wave train from one frequency or phase to another;

(b) The gating of the phase-displaced base signals by magnetic means, as opposed to such conventional means as vacuum tubes, transistors, silicon-controlled rectifiers, etc., particularly so as to achieve low-power modulation of very high-powered radio-frequency signals; and (c) The frequency-stabilization of very high-powered radio-frequency signals by rendering the frequency of the output signals substantially independent of the velocity of rotation of the radio-frequency alternator.

The above concepts carry out the above-described objects of the invention, which will be more clearly understood from a perusal of the following specification, taken in connection with the accompanying drawings in which.

In the following discussion, the invention will be considered with respect to embodiments suitable for accomplishing the following results:

(1) Frequency-shift keying between two frequencies;

(2) Phase-shift keying with two channels of information;

(3) Phase-shift keying for one channel of information;

(4) Frequency-shift keeping and frequency stabilization with a carrier and upper and lower sidebands; and (5) Frequency modulation by a frequency-modulated audio signal.

Figure 1:
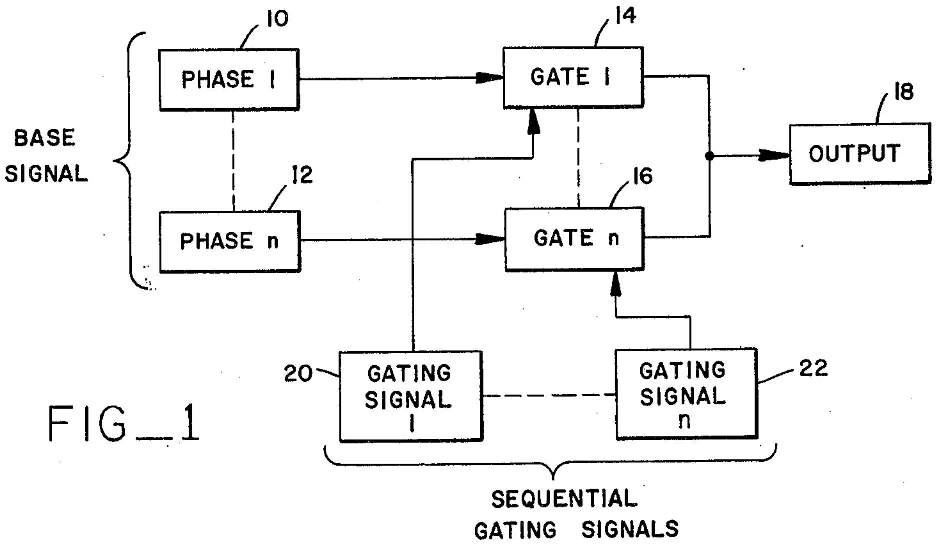
FIG. 1 is a block diagram illustrating the basic concept of the invention.

Referring to FIG. 1, the basic concept underlying this invention is shown by the block diagram which constitutes that figure. A plurality of base signals are produced by appropriate means represented by the boxes 10 and 12. It should be understood that there may be any required number of boxes such as 10 and 12, the only requirement being that the base signals produced therein be of the same frequency but of different phase from one another. The signals thus produced are conveyed through respective gate means 14, 16 which, within the broadest aspects of the invention, may consist of any appropriate device such as vacuum tubes, transistors, silicon-controlled rectifiers or saturable reactors such as are described in more detail hereinafter. The base signals which pass through the gates 14, 16 are combined to form an output signal 18.

The gates 14, 16 are operated by gating signals 20, 22. These gating signals may be of various types depending on the application envisioned, the only requirement being that they operate the gates 14, 16 in some sort of time sequence which may be either successive or over-lapping. In the broadest sense, the base signals may include one phase which is not gated at all, particularly in the single channel phase modulation system described hereinafter, although in most instances, all the base signals will be gated. In all the embodiments of the invention in which the transition from one base signal to the next is performed without discontinuity in the output wave train, the gating signals 20, 22 are derived at least in part from two or more alternating gating signals of the same frequency but of different phase.

1. Two-frequency frequency-shift keying

Figure 2:
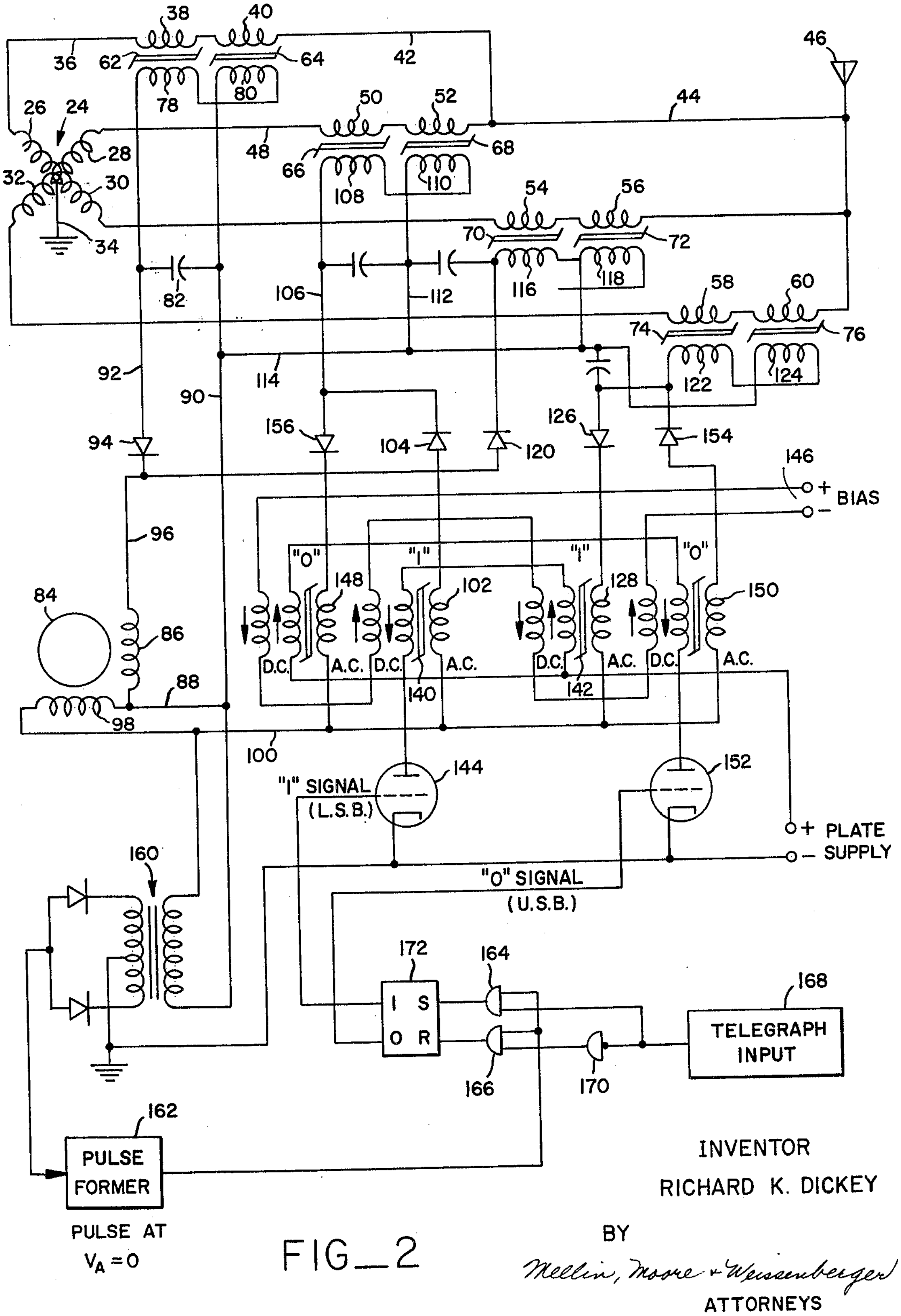
FIG. 2 is a circuit diagram, partially in schematic form, of an embodiment of the invention in which the type of modulation is frequency-shift keying between two frequencies.
Figure 3:
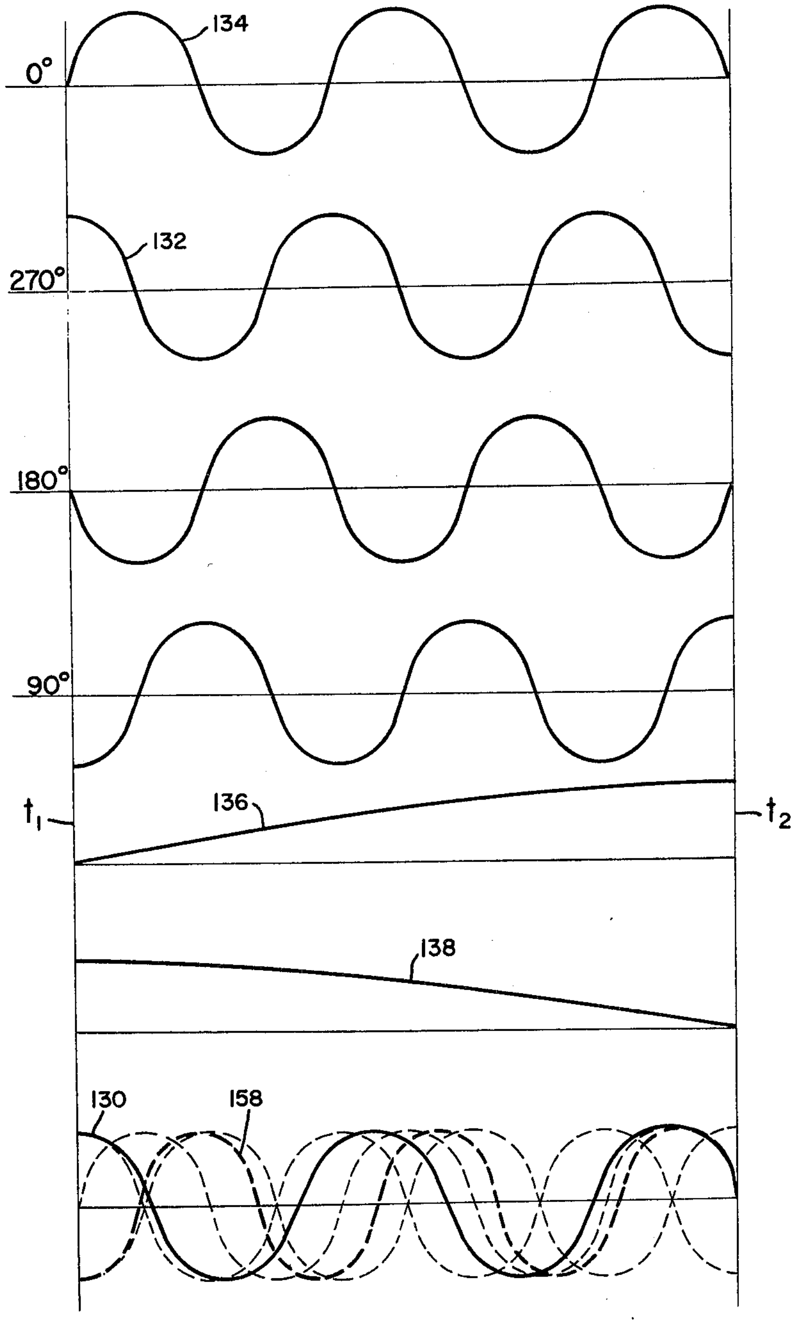
FIG. 3 is a diagram of wave forms illustrating the manner of operation of the circuit of FIG. 2.

The manner of operation of the above-described basic invention is more clearly shown in FIGS. 2 and 3. FIG. 2 shows the base signals being produced by a four-phase alternator generally shown at 24. The alternator 24 has four windings of which the 0° winding is designated as 26, the 90° winding as 28, the 180° winding as 30, and the 270° winding as 32. The junction of the four windings is grounded as at 34. The outer end of the 0° winding 26 is connected through lead 36, coils 38, 40, lead 42 and lead 44 to the antenna 46. Likewise, the 90° winding 28 is connected to the antenna 46 through leads 48, coils 50, 52 and lead 44. The windings 30, 32 are also connected to the antenna 46 in a like manner, as will be readily seen from FIG. 2, through coils 54, 56 and 58, 60, respectively.

The coils 38, 40 are wound on ferrite cores 62, 64 respectively. Likewise, the coils 50, 52 are wound on cores 66, 68; the coils 54, 56 on cores 70, 72; and the coils 58, 60 on cores 74, 76. The cores 62 through 76 are preferably made of a ferromagnetic ceramic material which saturates gradually under the influence of increasing magnetomotive force applied thereto. Materials possessing such characteristics are readily commercially available.

The cores 62, 64 have also wound thereon a pair of gating windings 78, 80. The gating windings 78, 80 are substantially short-circuited at the frequency of alternator 24 by a capacitor 82. The capacitance of capacitor 82 is, however, insufficient to constitute any significant admittance at the frequency of the gating signal produced, in FIG. 2, by the gating alternator 84. It will consequently be seen that radio-frequency current flow through the windings 38, 40 will induce equal and opposite electromotive forces in the windings 78, 80, so that no carrier frequency current will flow in these windings. As as result, the electric path between leads 36 and 42 is normally blocked by a very large effective impedance of the coils 38, 40.

If the operation of gating alternator 84 now produces a current flow in a downward direction in winding 86 of alternator 84, current will flow through leads 88, 90 coils 80, 78, lead 92, rectifier 94 and lead 96. This current at its peak is of sufficient magnitude to completely saturate cores 62, 64. Because of this saturation of the cores 62, 64, the coils 38, 40 are incapable of inducing any electromotive force opposing the flow of current in these windings while the gating signal from winding 86 is at its maximum. In that condition, therefore, the radio-frequency signal produced by the 0° winding 36 can freely flow to the antenna 46. As the gating signal from winding 86 gradually decays, the cores 62, 64 gradually become unsaturated and radio-frequency current flow through the coils 38, 40 is gradually reduced until it is substantially cut off when the current in winding 86 drops to zero.

It will be noted that in FIG. 2, the winding 98 of alternator 84 is displaced in phase by 90° from the winding 86. Consequently, a current will be induced in winding 98 in a direction toward the left a quarter cycle later than in the winding 86. At its peak, this current flows through lead 100, coil 102, rectifier 104, lead 106 coils 108, 110, lead 112, lead 114 and leads 90, 88 back to winding 98. Assuming that this current can pass freely through coil 102, it will readily be seen that the gating signal from winding 98 saturates cores 66, 68 a quarter cycle of alternator 84 after the saturation of cores 62, 64.

Due to the rectifying action of rectifier 94, it will readily be seen that the upwardly directed current in winding 86 which occurs in the next quarter cycle cannot affect coils 78, 80 but is instead directed through coils 116, 118 through rectifier 120. Consequently, cores 70, 72 saturate at the third quarter cycle of alternator 84. Similarly, the fourth quarter current flowing to the right in winding 98 is transmitted to coils 122, 124 and then through rectifier 126 and coil 128. Assuming again that this current can freely flow through coil 128, it will be seen that cores 74, 76 are saturated in the fourth quarter of the cycle of alternator 84. Because of this successive gating action, the signal received by antenna 46 is that of winding 26 during the first quarter of the cycle of alternator 84, gradually turns into that of winding 28 at the second quarter of the cycle of alternator 84, that of winding 30 at the third quarter, and that of winding 32 at the fourth quarter.

The resulting output wave has been plotted as 130 in FIG. 3. The curve 130 of FIG. 3 has been plotted by plotting points which contain 100% of the 270° signal 132 at time $t_1$, and then a sinusoidally decreasing portion of signal 132 and a cosinusoidally increasing portion of the 0° signal 134 until 100% of 0° signal 134 is reached at time $t_2$. The corresponding variations of the gating signals induced in the windings 86, 98 of alternator 84 are plotted in the same time relationship as 136, 138 respectively. It will be understood that although the frequency of the base signals has been shown in FIG. 3 as ten times that of the gating signal, it would, in a circuit like that of FIG. 2, more probably be on the order of one thousand times the frequency of the gating signal. The mathematical relationship between the two signals, however, remains the same regardless of their mutual frequency relation.

It can be readily mathematically demonstrated that if the base signal frequency is designated $f_b$ and the gating frequency $f_g$, the frequency of the wave train 130 is $f_b-f_g$.

So far, it has been assumed that the currents from winding 98 can flow freely through coils 102 and 128 which are wound, respectively, on cores 140, 142. This, however, is true only if the cores 140, 142 (which are preferably switching cores with a square loop characteristic) are biased in such a way by the energization of vacuum tube 144 that they are saturated in the direction of the current pulse through coil 102. If these cores are biased in the opposite direction by the weaker constant bias applied to terminals 146, the pulse from winding 98 cannot pass therethrough. It will be noted that in the circuit of FIG. 2, coils 102 and 128 are open when vacuum tube 144 is energized and blocked when it is not energized, and coils 148, 150 are open when vacuum tube 152 is energized and blocked when it is not.

Studying the circuit of FIG. 2 further, it will be seen that if vacuum tube 144 is de-energized and vacuum tube 152 is energized instead, the pulse from winding 98 which previously travelled through coil 102 now travels through coil 150 and rectifier 154 so that it affects coils 122 and 124 instead of coils 108, 110. Conversely, the pulse which previously travelled through coil 128 now travels through rectifier 156 and coil 148 so that it affects coils 108, 110 instead of coils 122, 124. The net effect of this arrangement is that the four phases of alternator 24 are sampled in the forward sequence when vacuum tube 144 is energized and in the reverse sequence when vacuum tube 152 is energized.

Applying the same reasoning to the latter situation as was previously applied in FIG. 3 to produce the output wave 130, it will be seen that energization of vacuum tube 152 will produce the output curve 158 in FIG. 3. Again, it can be readily mathematically demonstrated that, as FIG. 3 shows graphically, the frequency of wave train 158 is $f_b+f_g$. Consequently, it will be seen that by switching between vacuum tubes 144 and vacuum tube 152, the output at the antenna 46 can be shifted between the frequency $f_b-f_g$ and the frequency $f_b+f_g$; in other words, between the lower sideband of the suppressed carrier frequency of alternator 24 and the upper sideband thereof.

Referring again to FIG. 3, it will be seen that the transition from the lower sideband signal 130 to the upper sideband signal 158 can be made without discontinuity only at $t_2$, the time at which both waves are of zero amplitude. To assure that the switching between tubes 144 and 152 can only occur at $t_2$, the gating signal induced in winding 98 is fed to transformer 160. The transformer 160 has a center-tapped secondary which is connected as a full-wave rectifier. The full-wave rectified signal thus produced is fed through a pulse former 162 which produces a pulse whenever the current in winding 98 passes through zero. This pulse is fed to one input of each of the AND gates 164, 166. The other input of the AND gate 164 is directly connected to the telegraph keyer generally designated as 168, whereas the other input of the AND gate 166 is connected to the telegraph input 168 through an inverter 170. The output of the AND gate 164 is connected to the "set" terminals of a flip-flop circuit 172, whereas the output of the AND gate 166 is connected to the "reset" terminals of the circuit 172. The "1" output of the flip-flop circuit 172 is connected to the grid of tube 144, and the "0" output of the flip-flop circuit 172 is connected to the grid of tube 152. Consequently, it will be seen that actuation of telegraph keyer 168 will result in energization of tube 144 at the next zero amplitude point of the current in winding 98, and releasing of the telegraph keyer 168 will result in energization of tube 152 at the next zero amplitude point of the current in the winding 98. The net result is discontinuity-free frequency-shift keying.

It should be noted that the modulator power required in a circuit of this type is on the order of magnitude of the base alternator power times the ratio between the gating frequency and the base frequency. In a typical case, a one-megawatt 10–30 kc. base signal can be modulated by a 3 kw. 22.5 cps. gating signal, and the control signal can be of far less power yet.

2. Two-channel phase-shift keying

Figure 4:
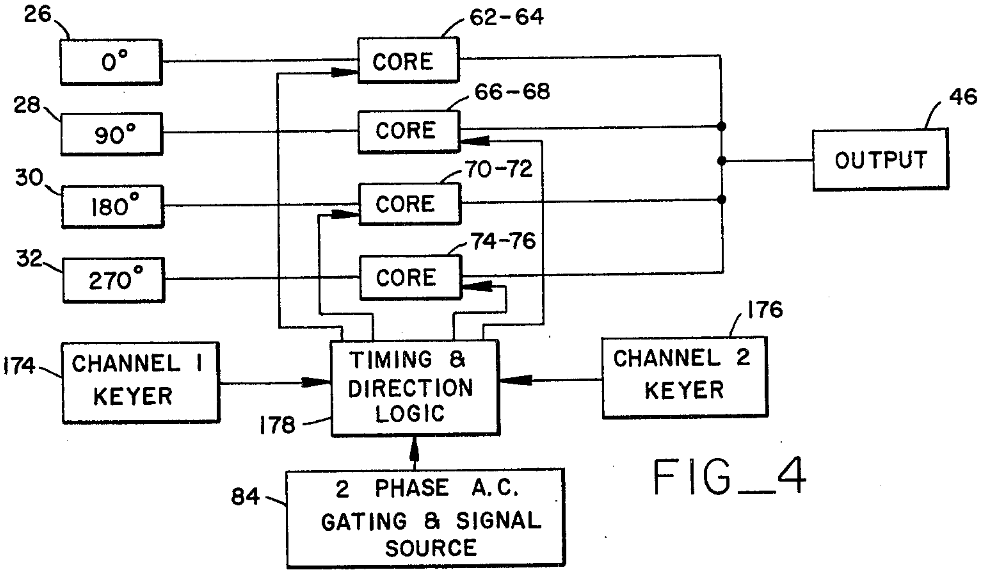
FIG. 4 is a diagrammatic illustration of the manner in which a circuit similar to that of FIG. 2 can be used for continuous phase shift keying.

FIG. 4 shows in schematic form how the circuit of FIG. 2 can be modified to carry two channels of information with phase-shift modulation. In this system, the presence of a 0° phase component in the output corresponds to the "on" condition of the first channel; the presence of a 180° phase component in the output corresponds to the "off" condition of the first channel; the presence of a 90° phase component in the output corresponds to the "off" condition of the second channel, and the presence of 270° phase component in the output corresponds to the "off" condition of the second channel. Consequently, as will be apparent from the phase vector diagram of FIG. 5, the actual phase of the output signal is 45° when both channels are on, 135° when channel 1 is off and channel 2 is on, 225° when both channels are off, and 315° when channel 2 is off and channel 1 is on.

In apparatus of the type shown in FIG. 2, this result can be accomplished by so wiring the gating windings of the cores that the "on" condition of channel 1 saturates core 62–64, the "on" condition of channel 2 saturates core 66–68, the "off" condition of channel 1 saturates core 70–72, and the "off" condition of channel 2 saturates core 74–76. The conditions of the channel 1 keyer 174 and the channel 2 keyer 176 are, however, not directly transmitted to the cores. Rather, they are fed to the input of a timing and directional logic 178 which also receives the two-phase A.C. gating signals from the gating signal source 84. The timing and directional logic 178 operates in a well-known manner similar to that of the logic represented by elements 160 through 172 in FIG. 2, to produce wave trains of limited duration of either higher or lower frequency than the base frequency and of such phase as to connect without discontinuity of the two-phase-displaced output wave trains produced whenever one or both of the channels 174, 176 are switched from one condition to another.

Figure 5:
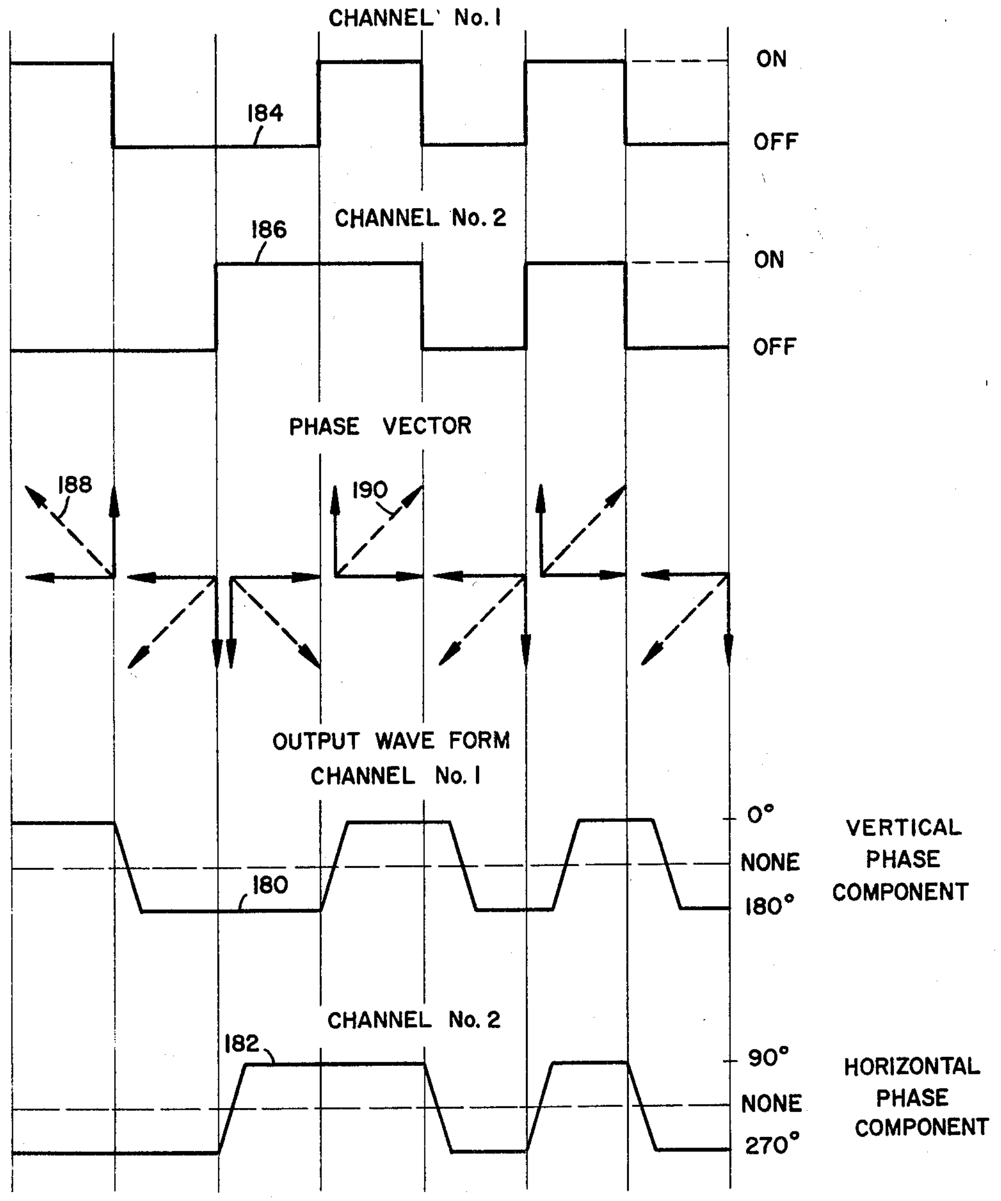
FIG. 5 is a diagram illustrating the keying modes and phase vectors involved in the operation of the circuit of FIG. 4.

If the resulting output signal is decomposed into its 0°–180° (vertical) component and its 90°–270° (horizontal) component, the resulting intelligence signals will look like graphs 180 and 182 in FIG. 5, respectively. The inclined portions of these graphs represent the short intervals during which the output signal at antenna 46 is of the upper or lower sideband frequency to link a carrier frequency wave train of one phase to a carrier frequency wave train of another phase. The steepness of the inclined portions can be increased by increasing the frequency of the A.C. gating signal, but this increase is limited as a practical matter by the permissible bandwidth. In most circumstances, however, the intelligence signals 180, 182 are sufficiently accurate reproductions of the key signals 184, 186 to convey the required intelligence.

3. Single-channel phase-shift keying

Single-channel phase-shift keying can be accomplished even more easily with the device of this invention. For this purpose, a three-phase alternator may be used; or the 0°, 90° and 270° phases of a four-phases of a four-phase alternator may be used. In either case, the 0° phase is fed to the output directly without passing through a gate, and the other two phases are gated. The phase shift representing the intelligence is accomplished simply by blocking one of the gated phases and passing the other, or blocking the second and passing the first. The net result will be a shift back and forth between two phases such as 188 and 190 of FIG. 5.

It will be understood that if the circumstances of use are such that a discontinuity between the two phase-shifted wave trains is immaterial, the shift from one to the other may be accomplished instantaneously by simply gating the gated phases on and off. If a discontinuity-free transition is required, however, a gradual gating involving a momentary frequency shift can be accomplished in the same manner as heretofore described with respect to FIGS. 2 through 4.

4. Combined FSK and frequency stabilization

Figure 6:
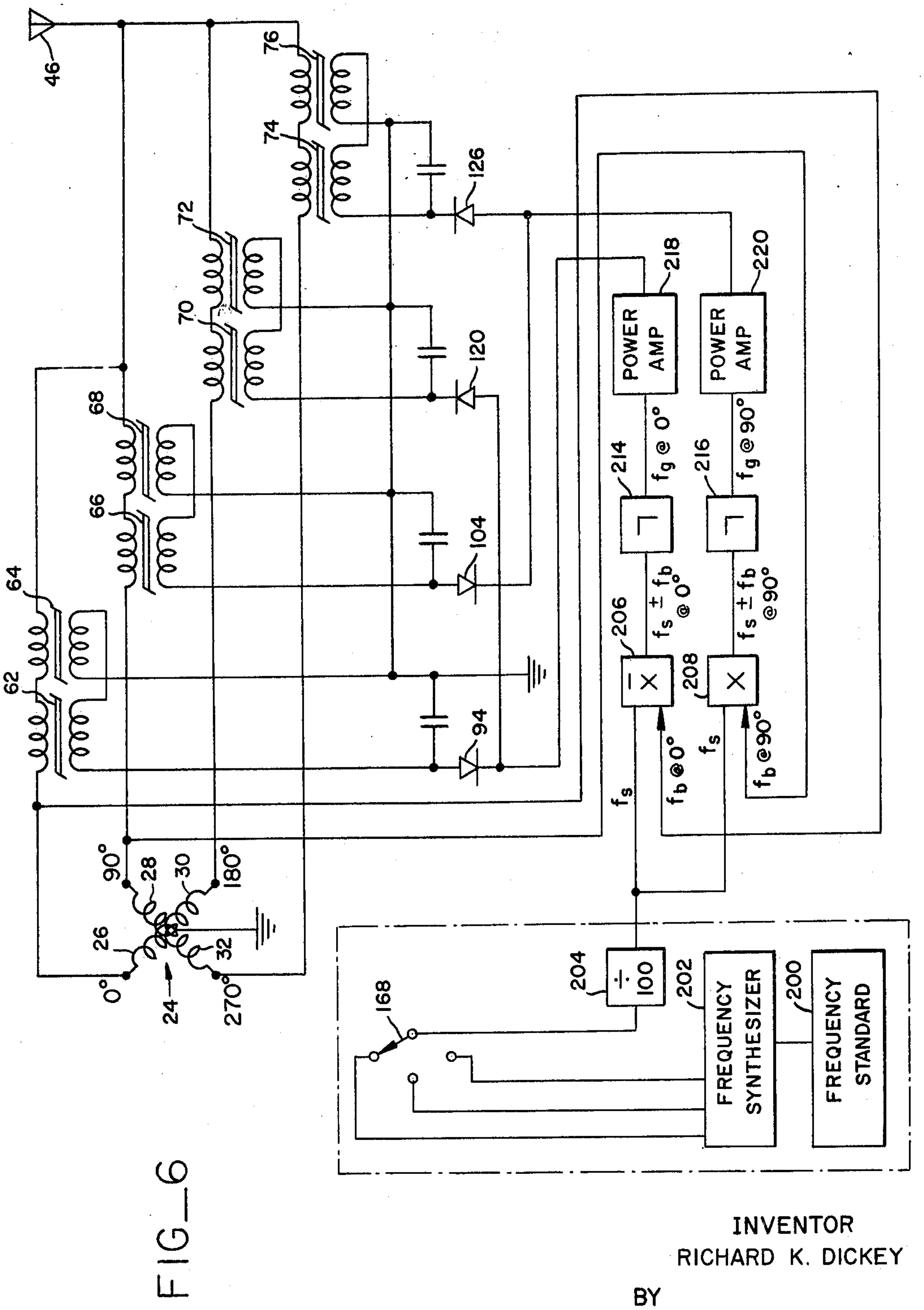
FIG. 6 is a partly schematic diagram illustrating an embodiment of the invention in which the output frequency is independent of the alternator frequency and is shiftable between three distinct frequencies.

FIG. 6 shows, in schematic form, an arrangement which is capable not only of producing a modulated signal of high power, but also of controlling the carrier frequency of that signal. This is an important capability of the device of this invention as a practical matter, because the base signal alternator 24 is preferably driven by a gas turbine similar to a jet engine. There are obviously many circumstances, among which variations of the fuel supply and variations in load, which can cause variations in the rotational velocity of the turbine. It is therefore highly desirable to provide a system in which the frequency of the output signal can be related not to the alternator speed, but to a standard reference frequency produced by a low-power device such as a crystal oscillator.

In the diagram of FIG. 6 in which provisions are made for the transmission of a carrier, a lower sideband and an upper sideband, the crystal-controlled oscillator is shown at 200. In a typical case, the standard frequency produced by the oscillator 200 may be, for example, 2.16 megacycles. This standard reference frequency is fed to a frequency synthesizer 202. The frequency synthesizer 202 may, for example, beat the standard reference frequency signal with a 2.25 kilocycle signal to produce three frequencies which, in the example chosen, are 2,162,250 cps., 2,160,000 cps., and 2,157,750 cps. The keyer 168 selects any one of these frequencies in accordance with the intelligence to be transmitted. The selected signal is then run through a frequency divider 202 which reduces its frequency by a factor of 100. This is done so that the maximum possible phase difference between the key-selected frequencies as fed to the transmitter cannot exceed 1/100 of 180° or 1.8 degrees. This phase difference is usually low enough to eliminate the need for a timing logic such as 160 through 172 in FIG. 2 by keeping the possible keying transients down to a tolerable level. It will also be seen that the system of FIG. 5, by using the synthesizer 202 to produce the different modulating frequencies, dispenses with the necessity for the tubes 144, 152 of the FIG. 2 embodiment and their associated circuits.

The signal produced by the frequency divider 204, whose frequency at any given time will be designated as $f_s$, is now fed to one of the inputs of a pair of mixers 206, 208. The other inputs of the mixers 206, 208 are the base signals from phase 26 and phase 28, respectively, of the alternator 24.

Assuming now that $f_s$ at a given moment is 21.6 kilocycles, and that the frequency $f_b$ of alternator 24 is 20 kilocycles, the mixers 206, 208 will each produce output frequencies of 41.6 kilocycles and 1.6 kilocycles, the outputs of mixer 208 being shifted 90° from the outputs of mixer 206. These outputs of mixers 206, 208 are fed through low pass filters 214, 216 in which the 41.6 kilocycle signals are eliminated. The net result is that the power amplifiers 218, 220 are supplied with signals which have a frequency $f_g$ of 1.6 kilocycles and are 90° out of phase with one another. When these signals are applied to the gating circuits previously described in connection with FIG. 2, it will be seen that the resulting output at the antenna is $f_b+f_g$, or 21.6 kilocycles. It will be noted that this is the same frequency as $f_s$, and it will consequently be realized that the frequency $f_b$ of alternator 24 has been eliminated as a factor in the final signal output. Consequently, the output frequency at the antenna is exactly the same as the signal frequency $f_s$ selected at any given moment by the key 168.

5. Frequency modulation

Figure 7:
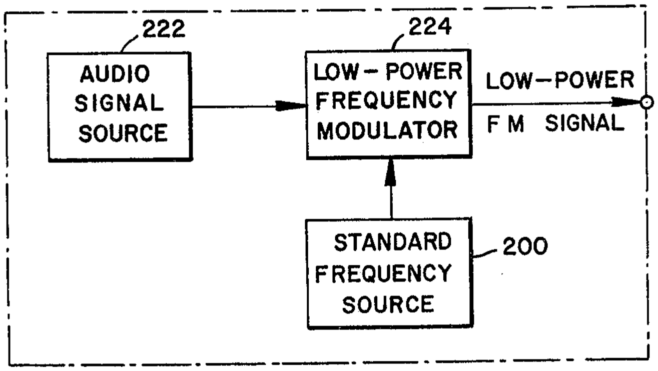
FIG. 7 is a block diagram illustrating an alternative modulation signal source which, when used in the apparatus of FIG. 6, will produce conventional frequency modulation.

FIG. 7 illustrates an alternative method of producing $f_s$ in FIG. 6 for such purposes as, for example, voice modulation. In this embodiment, an audio signal source 222 such as a microphone operates a frequency modulator 224 which converts the signal from the crystal-controlled oscillator 200 into an ordinary low-power FM signal. In this instance, there is no abrupt switching between different frequencies, and hence no frequency divider is required to minimize discontinuities. However, a frequency divider may be included if other considerations make it desirable.

It will be readily seen that if the apparatus of FIG. 7 is used in lieu of the apparatus within the dot-dash lines of FIG. 6 in conjunction with the remainder of the apparatus of FIG. 6, the output at the antenna will be a high-power frequency-modulated signal conveying the voice modulation provided by the audio signal source 222.

It will be seen that the above-described invention has numerous applications in various fields of electronic technology. Consequently, the embodiments described above are to be taken merely as illustrative of the concepts described herein.

I claim:

1. The method of producing a frequency shift-keyed alternating current electrical signal comprising the steps of:

(a) producing a plurality of first signals of identical frequency but different phase;
(b) producing a plurality of second signals of identical frequency but different phase; and
(c) using said second signals to sequentially transmit at least portions of said first signals to a common output in a given order to produce a first output frequency; and in the reverse order to produce a second output frequency.

2. The method of claim 1 as carried out by means of reactors, in which said first signals are transmitted through separate reactors to said common output, and the instantaneous reactance of said reactors is selectively controlled by said second signals.

3. The method of claim 1 in which there are four first signals in quadrature with one another, and two second signals in quadrature with one another.

4. The method of producing a phase shift-keyed alternating current electrical signal comprising the steps of:

(a) producing a plurality of first signals of identical frequency but different phase;
(b) producing a plurality of second signals of identical frequency but different phase; and
(c) using said second signals to sequentially transmit at least portions of said first signals to a common output normally in a given order to produce, at said output, output signals having a first output frequency, and in the reverse order for limited periods of time selected to produce, at said output, output signals having a second output frequency and having the proper length and phase to connect without discontinuity two of said output signals produced at said output at different times and having said first output frequency but differing from one another in phase.

5. The method of claim 4 as carried out by means of reactors, in which said first signals are transmitted through separate reactors to said common output, and the instantaneous reactance of said reactors is selectively controlled by said second signals.

6. The method of claim 4 in which there are four first signals in quadrature with one another, and two second signals in quadrature with one another.

7. Apparatus for producing electric signals, comprising:

(a) means for producing a plurality of high-powered alternating-current signals of identical frequency but different phase;
(b) a common output;
(c) means for radiating said signals from said common output;
(d) connecting means electrically connecting each of the plural signals of said first-named means in parallel to said common output;
(e) impeding means of variable impedance interposed in series in each of said connecting means, said impeding means being arranged to variably impede occurrence of selected ones of said signals by increasing the series impedance of selected ones of said connecting means; and
(f) means for cyclically varying the impedance of said impeding means.

8. The apparatus of claim 7, in which said impeding means comprise saturable magnetic core means.

9. Apparatus for producing electric signals, comprising:

(a) means for producing at least three first alternating-current signals of identical frequency but different phase;
(b) means for producing at least two second alternating-current signals of identical frequency but different phase;
(c) at least two saturable reactor means;
(d) means for conveying each of said first signals to a common output, at least two of said first signals being conveyed each through a separate one of said reactor means, and said reactor means being so connected as to block said first signals when unsaturated and to pass them when saturated; and (e) means utilizing said second signals to separately control the instantaneous level of saturation of each of said reactor means in accordance with said second signals;

(f) said utilizing means being arranged to switch between a first condition in which it passes a first and a second of said first signals uniformly, and a second condition in which it uniformly passes said second and third of said first signals, by gradually substituting a third of said first signals for the first or vice versa.

10. Apparatus for producing electric signals, comprising:

(a) means for producing a plurality of first alternating-current signals of identical frequency but different phase;

(b) means for producing a plurality of second alternating-current signals of identical frequency but different phase;

(c) a plurality of saturable reactor means;

(d) means for conveying each of said first signals to a common output through a separate one of said reactor means, said reactor means being so connected as to block said first signals when unsaturated and to pass them when saturated;

(e) means utilizing said second signals to separately control the instantaneous level of saturation of each of said reactor means in accordance with said second signals;

(f) said utilizing means being so connected as to produce at said output an output signal representing a gradual transition from one of said first signals to another in a predetermined sequence, a portion of each of said first signals appearing once at said output in each cycle of said second signals; and (g) control means for changing said predetermined sequence.

11. The apparatus of claim 10, in which said control means include ferromagnetic switching cores, and means for switching said switching cores.

12. The apparatus of claim 11, in which said switching means include electronically controlled switching devices.

13. The apparatus of claim 10, further comprising logic means for preventing actuation of said control means except at a predetermined portion of the cycle of said second signals.

14. The apparatus of claim 13, in which said logic means include a flip-flop circuit.

15. The apparatus of claim 9, in which said first-signal-producing means is a multiphase alternator.

16. A high-power radio transmitter comprising:

(a) a multiphase alternator running at radio frequency;

(b) an antenna;

(c) means individually connecting the phases of said alternator to said antenna through separate saturable ferromagnetic core means having an impedance varying substantially uniformly with magnetomotive force below saturation;

(d) a multiphase source of alternating-current gating signals of sufficient amplitude to saturate said core means; and (e) rectifier-controlled network means for successively applying portions of said gating signals to each of said core means in a predetermined sequence.

17. The transmitter of claim 16, in which said portions of said gating signals are complete half-cycles all having the same polarity.

18. The transmitter of claim 17, in which said gating signal source includes a source of modulating signals and a pair of mixers, one of said mixers mixing said modulating signal with the signal produced by one phase of said alternator, and the second mixer mixing said modulating signals with the signal produced by another phase of said alternator differing from said one phase by other than 180°, said gating signals being the output signals of said mixers.

19. The transmitter of claim 18, in which said alternator phases are in quadrature with one another.

20. The transmitter of claim 19, in which said modulating signals are frequency-modulated about a standard center frequency.

21. The transmitter of claim 17, further comprising control means for changing said sequence.

22. The transmitter of claim 21, in which said control means include ferromagnetic switching cores, and means for switching said switching cores.

23. The transmitter of claim 22, in which said switching means include electronically controlled switching devices.

24. The transmitter of claim 21, further comprising logic means for preventing actuation of said control means except at a predetermined portion of the cycle of said second signals.

25. The transmitter of claim 24, in which said logic means include a flip-flop circuit.

26. The transmitter of claim 17, in which said gating signal source is an alternator running at audio frequency.

27. The transmitter of claim 26, in which said audio-frequency alternator has two phases displaced by 90°, and said radio-frequency alternator has four phases displaced from each other by 90°.

28. The method of producing a frequency-modulated sine-wave alternating-current electric signal comprising the steps of:

(a) producing four first sine-wave signals of mutually identical frequency but in quadrature with one another;

(b) selectively presenting said first signals to a common output in varying proportions;

(c) producing two second sine-wave signals of mutually identical frequency but in quadrature with one another; and (d) using said second signals to control the instantaneous relative proportion of each of said first signals presented to said common output in such a manner that said first signals are selectively sampled in a one of two sequences, the first sequence causing the output frequency to be higher than said first-signal frequency, the second sequence causing it to be lower.

29. The apparatus of claim 8, in which said magnetic core means have signal winding means so connected as to normally block transmission of a signal therethrough, gate winding means, and means for producing a current through said gate winding means; the material of said core means being such that said blockage of transmission is substantially linearly reduced as the gate winding current is varied from zero to a magnetic core saturation level.

30. Apparatus for producing electric signals, comprising:

(a) means for producing a plurality of first alternating current signals of identical frequency but different phase;

(b) means for producing a plurality of second alternating current signals of identical frequency but different phase;

(c) a plurality of saturable reactor means;

(d) means for conveying each of said first signals to a common output through a separate one of said reactor means, said reactor means being so connected as to block said first signals when unsaturated and to pass them when saturated; and (e) means including rectifier-control network means utilizing said second signals to separately control the instantaneous level of saturation of each of said reactor means in accordance with said second signals by successively applying portions of said second signals to each of said reactor means.

31. A high-power radio transmitter comprising:

(a) a multiphase alternator running at radio frequency;

(b) an antenna;

(c) means individually connecting the phases of said alternator to said antenna through separate saturable ferromagnetic core means having an impedance varying substantially uniformly with magnetomotive force below saturation;

(d) a multiphase source of alternating-current gating signals of sufficient amplitude to saturate said core means; and (e) rectifier-controlled network means for successively applying portions of said gating signals to each of said core means in a predetermined sequence;

(f) said gating signals being applied to said core means in such a manner as to produce a first series of outputs of identical frequency but different phase, the outputs of said first series linked by outputs of different frequency providing discontinuity-free transitions between said first series of outputs.

32. The device of claim 7, in which said first-named means are polyphase alternator means.

33. The device of claim 7, in which both said first-named and said last-named means are polyphase alternator means.

References Cited

UNITED STATES PATENTS

| | | | |
|---|---|---|---|
| 3,112,448 | 11/1963 | McFarlane et al. | 178—66 |
| 1,739,948 | 12/1929 | Chireix | 325—110 |
| 2,139,232 | 12/1938 | Hysko. | |
| 2,624,041 | 12/1952 | Evans | 325—145 X |
| 2,708,219 | 5/1955 | Carver. | |
| 3,313,363 | 4/1964 | Landee et al. | 325—138 |

ROBERT L. GRIFFIN, Primary Examiner

JAMES A. BRODSKY, Assistant Examiner

U.S. Cl. X.R.

178—66; 179—15; 325—30, 163, 170, 173; 332—12, 21